(12) United States Patent
Wang

(10) Patent No.: US 7,309,091 B2
(45) Date of Patent: Dec. 18, 2007

(54) ROOF COVER PLATE FOR THE CABIN OF A CAR

(76) Inventor: Zhengzhong Wang, 20 Nanshan Middle Road, Fongcheng, Shandong 264300 (CN)

( * ) Notice: Subject to any disclaimer, the term of this patent is extended or adjusted under 35 U.S.C. 154(b) by 0 days.

(21) Appl. No.: 10/579,435

(22) PCT Filed: Nov. 15, 2004

(86) PCT No.: PCT/CN2004/001304

§ 371 (c)(1),
(2), (4) Date: May 15, 2006

(87) PCT Pub. No.: WO2005/049353

PCT Pub. Date: Jun. 2, 2005

(65) Prior Publication Data

US 2007/0029830 A1  Feb. 8, 2007

(30) Foreign Application Priority Data

Nov. 18, 2003  (CN) .................. 2003 1 0116713

(51) Int. Cl.
*B60J 7/08* (2006.01)
(52) U.S. Cl. .................. 296/26.06; 296/24.33; 296/210
(58) Field of Classification Search ........ 296/165, 296/176, 24.33, 26.04, 26.06, 181.5, 182.1, 296/210

See application file for complete search history.

(56) References Cited

U.S. PATENT DOCUMENTS

| | | | | |
|---|---|---|---|---|
| 2,074,620 A | * | 3/1937 | Sa Couto | 296/99.1 |
| 3,061,359 A | * | 10/1962 | Pearlman | 296/26.06 |
| 3,198,571 A | * | 8/1965 | Majeski | 296/26.05 |
| 3,378,298 A | * | 4/1968 | Wingen | 296/99.1 |
| 3,411,819 A | * | 11/1968 | Tyree et al. | 296/164 |
| 3,479,079 A | * | 11/1969 | Coursault | 296/26.06 |
| 3,781,059 A | * | 12/1973 | Davis | 296/76 |
| 3,789,080 A | * | 1/1974 | Perry et al. | 585/818 |

(Continued)

FOREIGN PATENT DOCUMENTS

DE  31 03 062 A1  8/1982

(Continued)

*Primary Examiner*—Jason S Morrow
(74) *Attorney, Agent, or Firm*—Barnes & Thornburg LLP

(57) ABSTRACT

The invention provides a cab roof of a vehicle with a movable panel. The cab is provided with a front windscreen, a rear deck or rear walls, and door frames at both sides. The door frames are connected with the front windscreen at the front side, with the rear decks or rear walls at the rear side, forming the enclosing sidewalls of the cab. The connecting cover is hinged with the enclosing sidewalls at the front end, and is provided with rear windscreen at the rear end. The entire cab roof is consisted of the connecting cover and the rear windscreen. A telescopic bellow is at the bottom of the cab roof, which connects the enclosing sidewalls at the lower portion. A raising and lowering device is at the bottom of the rear side of the cab roof. The vehicle can be used as a car where passengers can be seated in the rear seats, and as well as a sports car where the cab roof drops on the enclosing sidewalls by pressing the telescopic bellow. The vehicle, which can play the two roles, is applied to various kinds of cars and sports cars.

16 Claims, 4 Drawing Sheets

U.S. PATENT DOCUMENTS

| | | | | |
|---|---|---|---|---|
| 4,305,614 A | * | 12/1981 | Holka et al. | 296/37.16 |
| 4,458,937 A | * | 7/1984 | Beckmann et al. | 296/180.3 |
| 4,758,038 A | * | 7/1988 | Okada | 296/26.06 |
| 4,815,786 A | * | 3/1989 | McRay | 296/165 |
| 5,213,390 A | * | 5/1993 | Borchers | 296/165 |
| 5,951,095 A | * | 9/1999 | Herndon | 296/165 |
| 6,565,143 B2 | * | 5/2003 | Okamoto | 296/165 |

FOREIGN PATENT DOCUMENTS

| | | |
|---|---|---|
| DE | G93 17 798.4 U1 | 2/1994 |
| EP | 0 855 302 | 7/1998 |
| EP | 1 213 169 A1 | 6/2002 |

* cited by examiner

B-B

ROOF COVER PLATE FOR THE CABIN OF A CAR

CROSS-REFERENCE TO RELATED APPLICATIONS

This application is a U.S. national application under 37 C.F.R. § 371(b) of international application serial no. PCT/CN2004/001304 filed Nov. 15, 2004, which claims priority to Chinese application serial no. 200310116713.6 filed Nov. 18, 2003.

FIELD OF THE INVENTION

The present invention relates to a movable roof panel of a car and, more particularly, to a roof cover plate for the cabin of a car.

BACKGROUND OF THE INVENTION

As we all know, in a full-size passenger car and a sport car, a front windshield and a rear structure are provided at the front side and the rear side of a cabin respectively. The rear structure, such as a separator wall or plate, separates the cabin from the trunk of the car. A rear windshield is provided above the rear side of the rear structure. Door frames are provided at both sides of the cabin. A surrounding border of the cabin is formed by connecting the car door frames with the front windshield at the front side and connecting the car door frames with the rear structure and the rear windshield at the rear side. A fixed cabin roof cover plate is provided above the front windshield, the door frames and the rear windshield. In a compact car, a front windshield and a rear surrounding border are provided at the front side and the rear side of a cabin respectively. The door frames are provided at both sides of the cabin. A surrounding border of the cabin is formed by connecting the car door frames with the front windshield at the front side and connecting the car door frames with the rear surrounding border at the rear side. A fixed cabin roof cover plate is provided above the front windshield, the door frames and the rear surrounding border. The front and rear parts of the roof cover plate of the car cabin have substantially the same height. In comparison with a sport car, the car with a fixed cabin roof cover plate, which has substantially the same height in the front and rear, provides lower traveling speed, poor stability and high fuel consumption. To reduce the resistance and the fuel consumption, and to increase the traveling speed and improve stability, the backward slope of the cabin roof plate of a sport car is large, the rear part of the cabin roof plate is much lower than the part. The sport car with a fixed cabin roof plate, which has large backward slope and has a much lower height in the rear side than in the front side, can not provide enough space in the back seat for adult people, and only children and pets can be fitted into the back seat.

SUMMARY OF THE INVENTION

The invention is made to solve the following problems of passenger cars and sport cars, that is: compared with the sports car, a passenger car with a fixed cabin roof cover plate which has substantially the same height in the front side and the rear side, has low traveling speed, poor stability and high fuel consumption; the sport car with a fixed cabin roof cover plate has large backward slope, and the rear part of cabin roof cover plate is much lower than the front part, thus the back seats do not have enough space for adult people and only children and pets can be fitted into the back seat. This object of the invention is to provide a cabin roof cover plate of a car which can provide fast traveling speed, excellent stability, less fuel consumption, simple structure, low manufacturing cost, having enough space in the back seat for adult people, so that a car can be used as both a passenger car and a sport car.

To achieve the object of the invention, there is provided a roof cover plate for the cabin of a car, a front windshield be provided at the front side of the cabin, a rear structure or rear surrounding border being provided at the rear side of the cabin, and car door frames being provided at the left and right sides of the cabin, an surrounding border of the cabin being formed by connecting the car door frames with the front windshield at the front side and connecting the car door frames with the rear structure or the rear surrounding border at the rear side, wherein the front end of a cover panel being hinged to the upper portion of said surrounding border of the cabin, and the cover panel being provided with a rear windshield at its rear portion, the cover panel and the rear windshield forming an integral roof cover plate of the cabin, an extendable and retractable enclosure plate being provided under the roof cover plate of the cabin, the lower end of the extendable and retractable enclosure plate being connected with the surrounding border of the cabin, a raising and lowering device being provided under the rear end of the roof cover plate of the cabin.

The invention has the following advantages. Since the front end of a cover panel is hinged to the upper portion of the surrounding border of the cabin, the cover panel and the rear windshield form an integral roof cover plate of the cabin, an extendable and retractable enclosure plate is provided under the roof cover plate of the cabin, and the lower end of the extendable and retractable enclosure plate is connected with the surrounding border of the cabin, the height of the roof cover plate of the cabin can be adjusted in the up and down direction, and can be adjusted to a certain level which can make the passenger in the back seat feel comfortable, without be limited by the height of door frames on both sides of cabin. The backward slope of the door frames may be very large, the rear side of the door frames can be much lower than the front side. All theses features can provide faster traveling speed, excellent stability, less fuel consumption, simple structure, low manufacturing cost. In the case that the roof cover plate is raised, it provides enough space in the back seat for adult people, and such car can be used as a passenger car. In the case that the roof cover plate is lowered onto the surrounding border of the cabin by pressuring the extendable and retractable enclosure plate, the car can be used as a sport car. Therefore, the car like this can function as a passenger car and a sport car. A raising and lowering device is provided under the rear end of the roof cover plate, so this facilitates raising and lowering the roof cover plate. This invention is applicable to various kinds of passenger cars and sport cars.

BRIEF DESCRIPTION OF THE ACCOMPANYING DRAWINGS

FIG. 1 is a front view and FIG. 2 is an enlarged partial sectional view taken along line A-A in FIG. 1;

FIG. 3 is a front view and FIG. 4 is an enlarged partial sectional view taken along line B-B in FIG. 3;

FIG. 5 is a front view, FIG. 6 is an enlarged partial sectional view taken along line C-C in FIG. 5, and FIG. 7 is an enlarged partial sectional view taken along line D-D in FIG. 5.

DETAILED DESCRIPTION OF THE PREFERRED EMBODIMENTS

Embodiment 1

Figure 1:
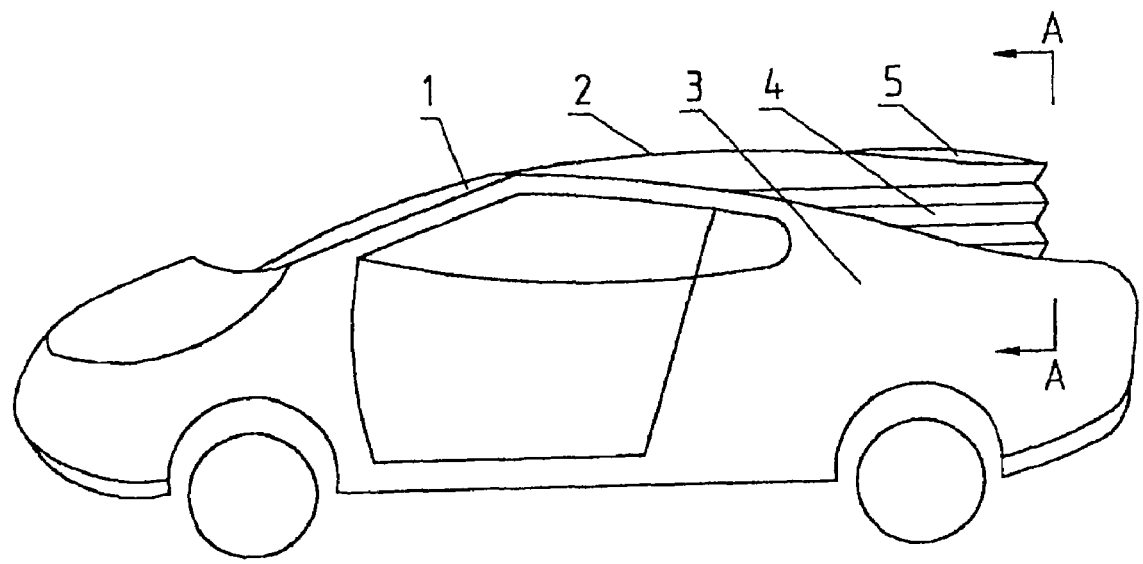
FIGS. 1 and 2 show an embodiment of the present invention.
Figure 2:
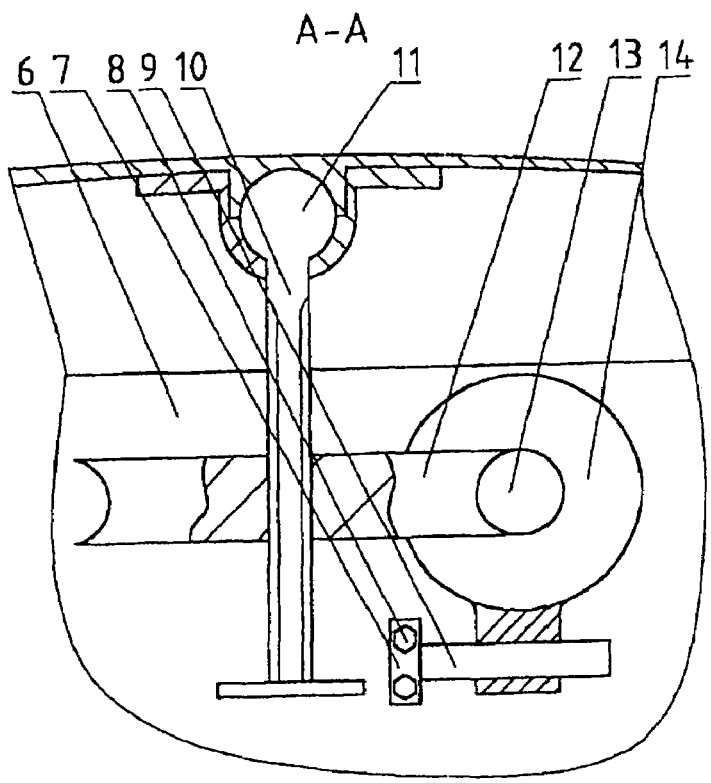

FIGS. 1 and 2 show the roof cover plate for the cabin of a car. A front windshield 1 is provided at the front side of the cabin, and a rear structure 6 is provided at the rear side of cabin. The car door frames 3 are provided at the left and right sides of the cabin. The car door frames 3 are connected with the front windshield 1 at the front side, and are connected with the rear structure 6 at the rear side, thus forming the surrounding border of the cabin. The front end of a cover panel 2 is hinged to the upper portion of the surrounding border which is located above the front windshield, as shown in FIG. 1. The connection of the cover panel 2 at a location above the front windshield can be achieved by means of a hinge, rubber or plastic etc. which functions as a hinge joint, so that the cover panel 2 can be raised and lowered. The cover panel 2 is provided with a rear windshield 5 at its rear portion, and forms an integral roof cover plate of the cabin together with the rear windshield 5 so as to be raised and lowered simultaneously. An extendable and retractable enclosure plate 4 is provided under the roof cover plate, and the lower end of the extendable and retractable enclosure plate 4 is connected with the surrounding border of the cabin to form a sealed cabin. The cabin roof cover plate can be lowered onto the surrounding border of the cabin by pressing the extendable and retractable enclosure plate 4. The extendable and retractable enclosure plate 4 may be made of plastic, rubber, canvas or corrugated plate etc. As shown in FIG. 1, the extendable and retractable enclosure plate 4 is a corrugated plate which can extend and retract in the up and down direction, so that the cabin roof cover plate can be raised or lowered. The backward slope of the door frames 3 can be large; the rear portion of the door frames 3 can be much lower than the front portion, such configuration contributes to the faster traveling speed, excellent stability, less fuel consumption, simple structure, and low manufacturing cost. When raising the cabin roof cover plate, there is enough space in the back seat for adult people, the car can be used as a passenger car. When the cabin roof cover plate is lowered onto the surrounding border of the cabin by pressing the extendable and retractable enclosure plate 4, the car can be used as a sport car. Thus, such a car can be used as a passenger car or a sport car. A raising and lowering device is provided under the rear end of the cabin roof cover plate. As shown in FIG. 2, the raising and lowering device comprises a motor 14 installed on the rear structure 6. A fixed base 7 can be provided on the rear side of the rear structure 6 and can be fixed to the rear side of the rear structure 6 through bolts 8, and the motor 14 is hinged to the fixed base 7 through a hinge shaft 9, so that the raising and lowering device is hinged to the rear structure 6. The motor 14 is provided with a worm 13 which engages with a worm wheel 12, the worm wheel is formed with a nut at its center; and a push rod 10, which is a thread rod, is connected with the nut and is hinged to the rear end of the cabin roof cover plate at its upper end. The push rod 10 can be hinged to the rear end of the cabin roof cover plate by means of self-contained cardan joint. The fixed base 7 can also be fixed on the door frames 3, and the motor 4 is hinged to the fixed base 7, so that the raising and lowering device is hinged to the door frames 3. During the operation, the motor 14 is operated so as to rotate the worm 13 in counterclockwise direction or clockwise direction, the worm 13 in turn rotates the worm wheel 12, thus raising or lowering the push rod 10 so as to raise or lower the cabin roof cover plate while extending or retracting the extendable and retractable enclosure plate 4. This facilitates raising and lowering the cabin roof cover plate.

Embodiment 2

Figure 3:
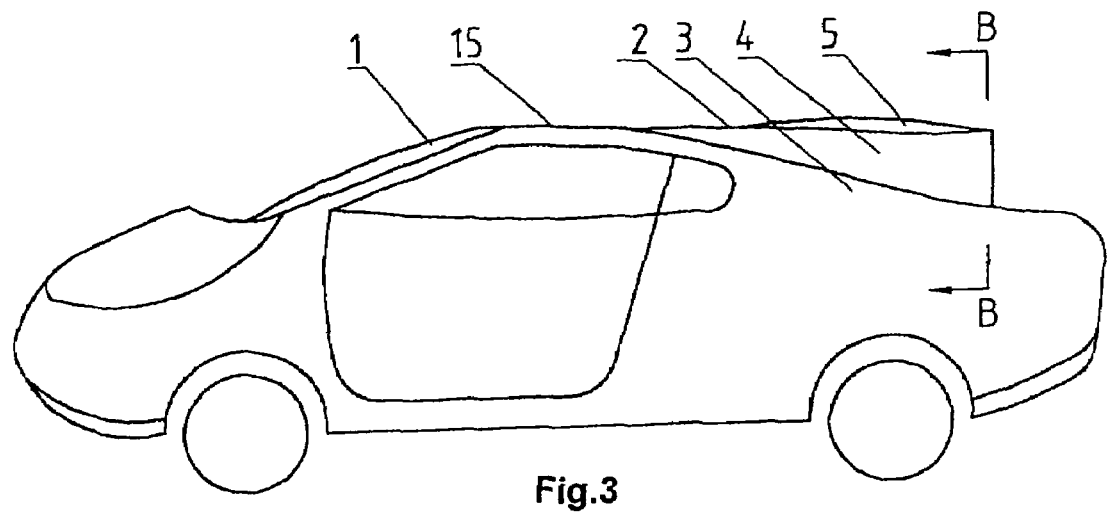
FIGS. 3 and 4 show another embodiment of the present invention.
Figure 4:
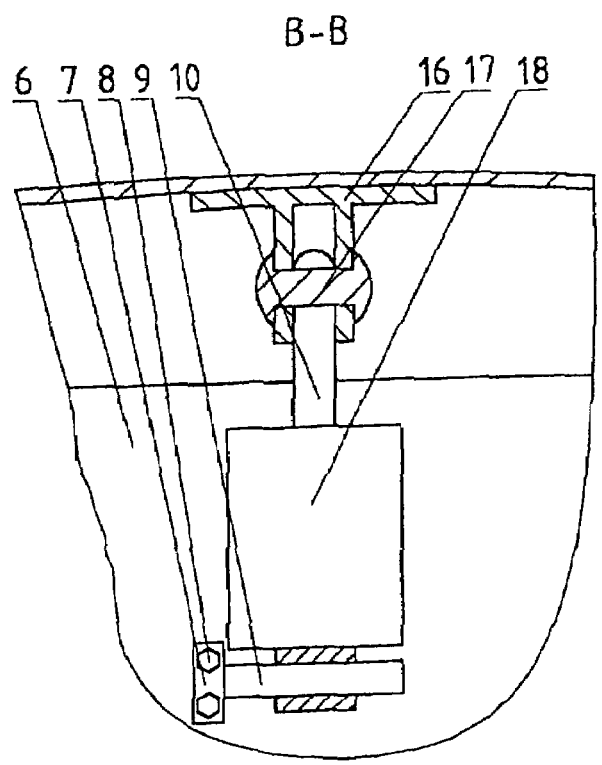

FIGS. 3 and 4 show the roof cover plate for the cabin of a car. A front windshield 1 is provided at the front side of the cabin, and a rear structure 6 is provided at the rear side of the cabin. The car door frames 3 are provided at the left and right sides of the cabin. The car door frames 3 are connected with the front windshield 1 at the front side, and are connected with the rear structure 6 at the rear side, thus forming the surrounding border of the cabin. The front end of a cover panel 2 is hinged to the upper portion of the surrounding border of the cabin. As shown in FIG. 3, a fixed cover panel 15 is fixedly connected to the upper end of the front windshield 1 and the upper end of the front portion of the car door frames 3, the front end of the cover panel 2 is hinged to the rear end of the fixed cover panel 15, and the front end of the cover panel 2 can be hinged to the rear end of the fixed cover panel 15 by means of a hinge, rubber or plastic etc. which functions as a hinge joint, so that the cover panel 2 can be raised and lowered. The cover panel 2 is provided with a rear windshield 5 at its rear portion, and forms an integral roof cover plate of the cabin together with the rear windshield 5 so as to be raised and lowered simultaneously. An extendable and retractable enclosure plate 4 is provided under the roof cover plate, and the lower portion of the extendable and retractable enclosure plate 4 is connected with the surrounding border of the cabin to form a sealed cabin. The cabin roof cover plate can be lowered onto the surrounding border of the cabin by pressing the extendable and retractable enclosure plate 4. The extendable and retractable enclosure plate 4 may be made of plastic, rubber, canvas or corrugated plate etc. As shown in FIG. 3, the extendable and retractable enclosure plate 4, which can be formed by plastic or rubber or canvas and etc, can extend and retract in the up and down direction, so that the cabin roof cover plate can be raised or lowered. The backward slope of the door frames 3 can be large; the rear portion of the door frames 3 can be much lower than the front portion, such configuration contributes to the faster traveling speed, excellent stability, less fuel consumption, simple structure, and low manufacturing cost. When raising the cabin roof cover plate, there is enough space in the back seat for adult people, the car can be used as a passenger car. When the cabin roof cover plate is lowered onto the surrounding border of the cabin by pressing the extendable and retractable enclosure plate 4, the car can be used as a sport car. Thus, such a car can be used as a passenger car or a sport car. A raising and lowering device is provided under the rear end of the cabin roof cover plate. As shown in FIG. 4, the raising and lowering device comprises a hydraulic cylinder 18 provided on the rear side of the rear structure 6. A fixed base 7 can be provided on the rear side of the rear structure 6 and can be fixed to the rear structure 6 through bolts 8, and the hydraulic cylinder 18 is hinged to fixed base 7 through a hinge shaft 9, so that the raising and lowering device is hinged to the rear structure 6. The hydraulic cylinder 18 is provided with a push rod 10 which is a piston rod, the upper end of the push rod 10 is hinged to the rear end of the cabin roof cover plate. A fork-like base 16 can be provided at the rear end of the cabin roof cover plate. The push rod 10 is hinged to the fork-like base 16 through a hinge shaft 17. The fixed base 7 can also be fixed on the car door frames 3, and the hydraulic cylinder 18 is hinged to the fixed base 7, so that the raising and lowering device is hinged to the car door frames 3. During the operation, the hydraulic cylinder 18 is operated to raise or lower the push rod 10, so as to raise or lower the cabin roof cover plate while extending or retracting the extendable and retractable enclosure plate 4. This facilitates raising and lowering the cabin roof cover plate.

Embodiment 3

Figure 5:
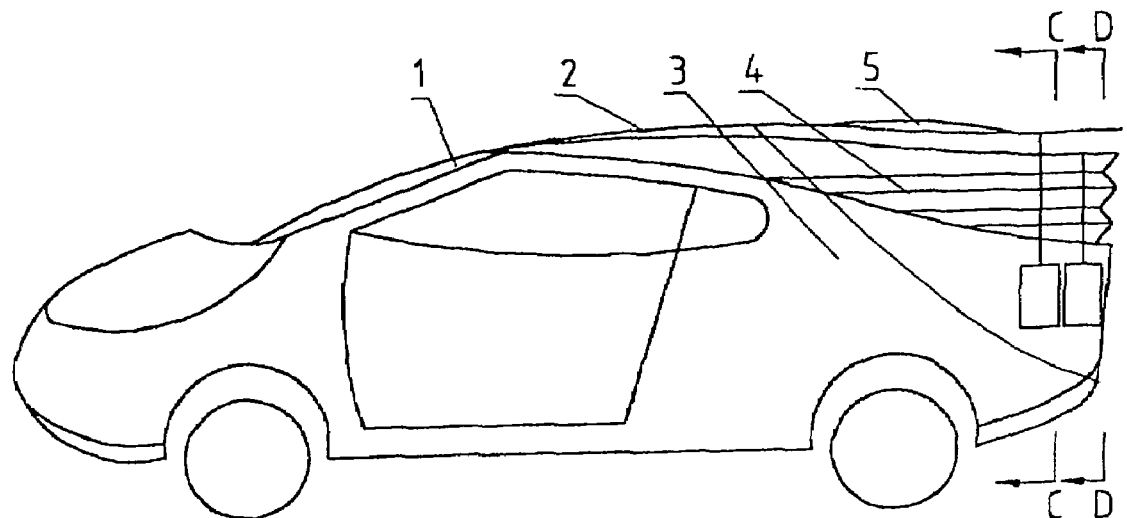
FIGS. 5, 6 and 7 show yet another embodiment of the present invention.
Figure 6:
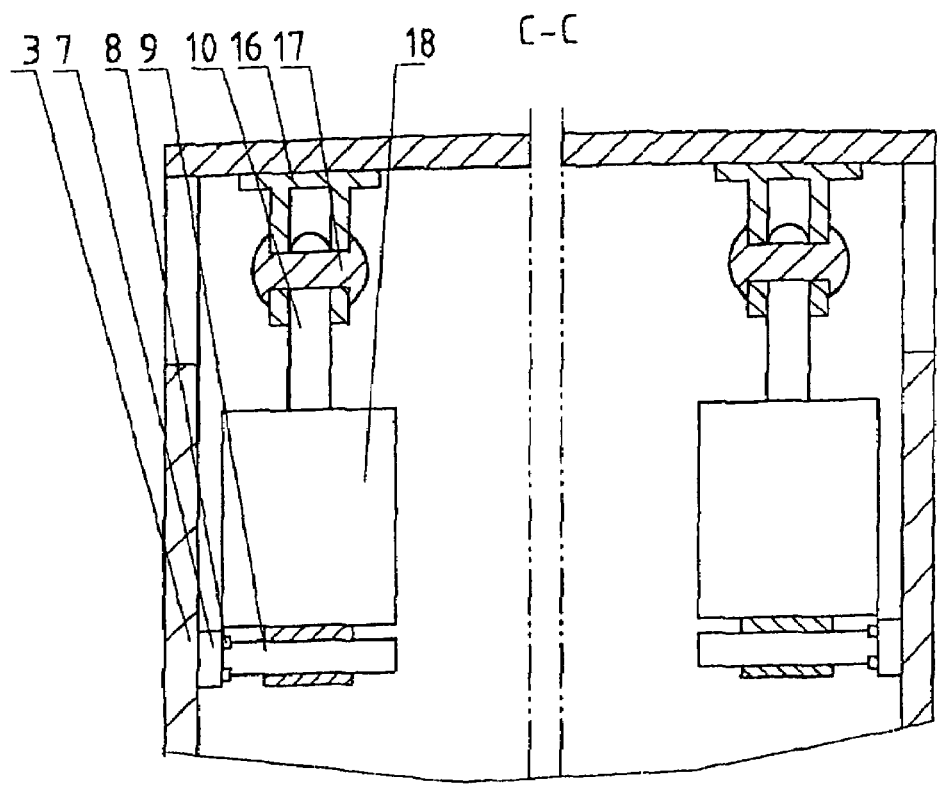
Figure 7:
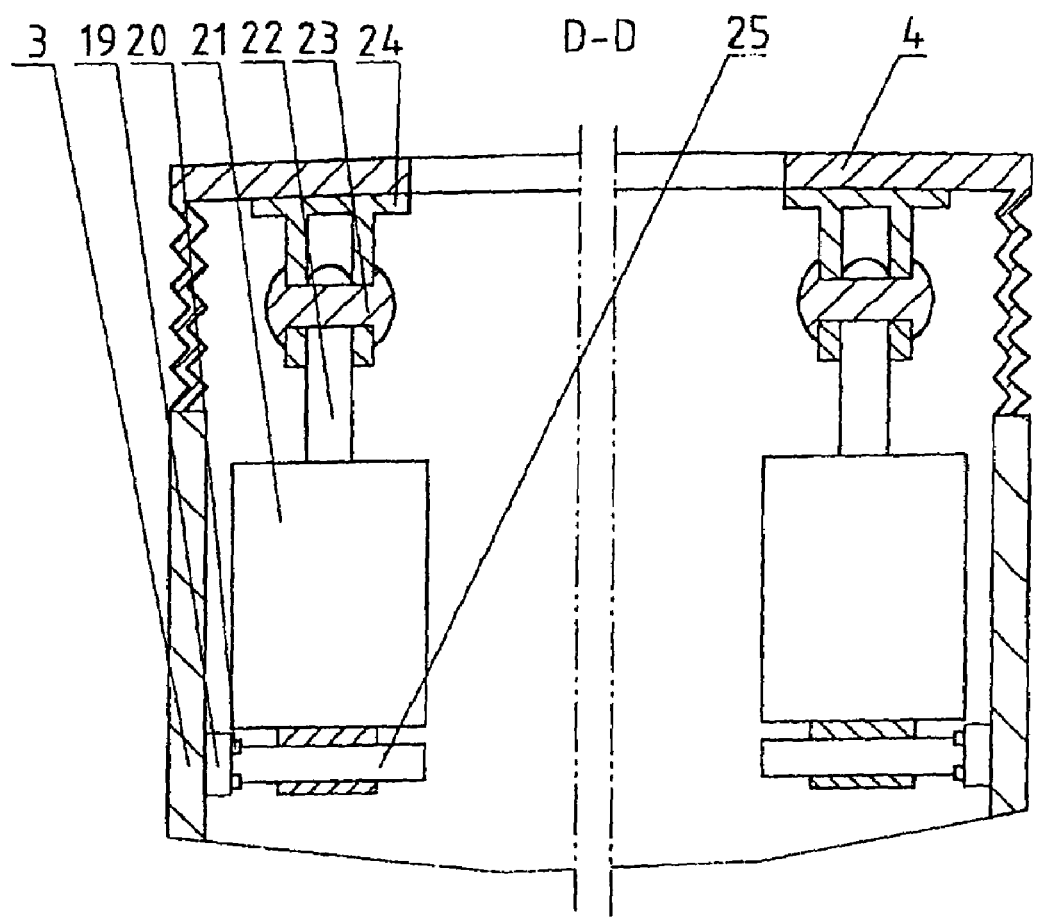

FIGS. 5, 6 and 7 show the roof cover plate for the cabin of a car. A front windshield 1 is provided at the front side of the cabin, and a rear surrounding border is provided at the rear side of cabin. The car door frames 3 are provided at the left and right sides of the cabin. The car door frames 3 are connected with the front windshield 1 at the front side, and are connected with the rear surrounding border at the rear side, thus forming the surrounding border of the cabin. The front end of a cover panel 2 is hinged to the upper portion of the surrounding border which is located above the front windshield 1, as shown in FIG. 5. The connection of the cover panel 2 at a location above the front windshield can be achieved by means of a hinge, rubber or plastic etc. which functions as a hinge joint, so that the cover panel 2 can be raised and lowered. The cover panel 2 is provided with a rear windshield 5 at its rear portion, and forms an integral roof cover plate of the cabin together with the rear windshield 5 so as to be raised and lowered simultaneously. An extendable and retractable enclosure plate 4 is provided under the roof cover plate, and the lower end of the extendable and retractable enclosure plate 4 is connected with the surrounding border of the cabin. The cabin roof cover plate can be lowered onto the surrounding border of the cabin by pressing the extendable and retractable enclosure plate 4. The extendable and retractable enclosure plate 4 may be made of plastic, rubber, canvas or corrugated plate etc. As shown in FIG. 5, the extendable and retractable enclosure plate 4 is a corrugated plate which can extend and retract in the up and down direction, so that the cabin roof cover plate can be raised or lowered. The backward slope of the door frames 3 can be large; the rear portion of the door frames 3 can be much lower than the front portion, such configuration contributes to the faster traveling speed, excellent stability, less fuel consumption, simple structure, and low manufacturing cost. When raising the cabin roof cover plate, there is enough space in the back seat for adult people, the car can be used as a passenger car. When the cabin roof cover plate is lowered onto the surrounding border of the cabin by pressing the extendable and retractable enclosure plate 4, the car can be used as a sport car. Thus, such a car can be used as a passenger car or a sport car. Raising and lowering devices are provided under rear end of the cabin roof cover plate, and as can be seen from the figures, the cabin roof cover plate and the extendable and retractable enclosure plate 4 are each provided with their own raising and lowering devices, which are respectively provided under the rear end of the cabin roof cover plate and the rear end of the extendable and retractable enclosure plate. As shown in FIG. 6, the raising and lowering devices, which are provided under the rear end of the cabin roof cover plate, comprise a hydraulic cylinder 18 which is provided on each of the car door frames 3 at the rear side of the car door frames 3. A fixed base 7 can be provided on each of the car door frames 3 at the rear side of the car door frames 3, and the fixed bases can be fixed to the left and right door frames 3 through bolts 8, and the hydraulic cylinders 18 are hinged to the fixed bases 7 through a hinge shaft 9, so that the raising and lowering devices are hinged to the left and right door frames 3 at the rear side of the left and right door frames 3. The hydraulic cylinders 18 are each provided with a push rod 10 which is a piston rod, the upper end of the push rod 10 is hinged to the rear end of the cabin roof cover plate. Fork-like bases 16 can be provided on the cabin roof cover plate, and the push rods 10 are hinged to the fork-like bases 16 through a hinge shaft 17. As shown in FIG. 7, the raising and lowering devices, which are provided under the rear end of the extendable and retractable enclosure plate 4, comprise a hydraulic cylinder 21 which is provided on each of the car door frames 3 at the rear side of the car door frames 3. A fixed base 19 can be provided on each of the car door frames 3 at the rear side of the car door frames 3, and the fixed bases can be fixed to the door frames 3 through bolts 20, and the hydraulic cylinders 18 are hinged to the respective fixed bases 19 through a hinge shaft 25, so that the raising and lowering devices are hinged to the left and right door frames 3 at the rear side of the left and right door frames 3. The hydraulic cylinders 21 are each provided with a push rod 22 which is a piston rod, the upper end of the push rod 22 is hinged to the underside of the rear end of the extendable and retractable enclosure plate 4. Fork-like bases 24 can be provided on the extendable and retractable enclosure plate 4, and the push rods 22 are hinged to the fork-like bases 24 through a hinge shaft 23. During the operation, the hydraulic cylinders 21 of the raising and lowering devices of the extendable and retractable enclosure plate 4 are operated to raise the push rods 22, and the hydraulic oil in the hydraulic cylinders 18 of the raising and lowering device of the cabin roof cover plate is discharged from the oil pipe, so as to raise the extendable and retractable enclosure plate 4 and the cabin roof cover plate, thus a sealed cabin is formed and the car can be used as a passenger car. The hydraulic cylinders 18 of the raising and lowering devices of the cabin roof cover plate are operated to lower the push rods 10, and the hydraulic oil in the hydraulic cylinder 21 of the raising and lowering devices of the extendable and retractable enclosure plate 4 is discharged from the oil pipe, the cabin roof cover plate is lowered onto the surrounding border of the cabin by pressing the extendable and retractable enclosure plate 4 and forms a sealed cabin, and such car can be used as a sport car. When the raising and lowering devices of the extendable and retractable enclosure plate 4 do not operate, and the hydraulic cylinders 18 are operated to raise the push rods 10 and thus raise the cabin roof cover plate, a cabin opening to the outside is formed, then it is possible to load and unload goods or ventilate the cabin. The cabin roof cover plate can be conveniently raised and lowered.

What is claimed is:

1. A car having a cabin and a trunk, the car comprising:
   a front windshield,
   a rear structure separating the cabin from the trunk,
   left and right car door frames, a surrounding wall of the cabin being formed by connecting the car door frames with the front windshield near a front side of the cabin and connecting the car door frames with the rear structure near a rear side of the cabin,
   a cover panel having a front end hinged to an upper portion of the surrounding wall of the cabin, the cover panel having a rear windshield near its rear portion, the cover panel and the rear windshield forming an integral roof cover plate of the cabin, an extendable and retractable enclosure plate located under the roof cover plate of the cabin, the lower end of the extendable and retractable enclosure plate being fixedly connected with the surrounding wall of the cabin, and the upper end of the extendable and retractable enclosure plate being fixedly connected with the roof cover plate of the cabin, and a raising and lowering device located under the rear end of the roof cover plate of the cabin and fixedly attached to a car body portion, the raising and lowering device being operable to raise and lower the roof cover plate of the cabin, the extendible and retractable enclosure plate being extended as the roof cover plate of the cabin is raised to form a sealed cabin together with the raised roof cover plate of the cabin and being retracted as the roof cover plate of the cabin is lowered.

2. The car according to claim 1, wherein the raising and lowering device comprises a motor, a worm coupled to the motor, a worm wheel coupled to the worm, and a push rod, the worm wheel has a nut at its center, the push rod has a threaded portion which is threadably received in the nut, and the upper end of the push rod is pivotably coupled to the rear end of the roof cover plate.

3. The car according to claim 1, wherein said raising and lowering device comprises a hydraulic cylinder having a push rod, and the upper end of the push rod is pivotably coupled to the rear end of the roof cover plate.

4. The car according to claim 1, wherein the raising and lowering device comprises left and right hydraulic cylinders which are respectively coupled to the left and right door frames near the respective rear sides of the left and right door frames, each hydraulic cylinder has a push rod, and the upper end of each push rod is pivotably coupled to the rear end of the roof cover plate.

5. The car according to claim 1, wherein the raising and lowering device is coupled to the rear structure or the door frames near the rear side of the door frames.

6. The car according to claim 1, wherein the raising and lowering device is pivotally coupled to the rear structure or the door frames.

7. The car according to claim 1, wherein the extendable and retractable enclosure plate comprises a plastic, rubber, canvas or corrugated sheet.

8. The car according to claim 1, wherein the raising and lowering device comprises a push rod that translates generally vertically and that has an upper end coupled to the roof cover plate.

9. A car having a cabin, the car comprising:
a front windshield,
a rear wall,
left and right car door frames, a surrounding wall of the cabin being formed by connecting the car door frames with the front windshield near a front side of the cabin and connecting the car door frames with the rear wall near a rear side of the cabin,
a cover panel having a front end hinged to an upper portion of the surrounding wall of the cabin, the cover panel having a rear windshield near its rear portion, the cover panel and the rear windshield forming an integral roof cover plate of the cabin,
an extendable and retractable enclosure plate located under the roof cover plate of the cabin, the lower end of the extendable and retractable enclosure plate being fixedly connected with the surrounding wall of the cabin, and a first raising and lowering device located under the rear end of the roof cover plate of the cabin, the first raising and lowering device being attached to a first car body portion and being operable to raise and lower the roof cover plate of the cabin,
a second raising and lowering device located under the rear end of the extendable and retractable enclosure plate and coupled thereto, the second raising and lowering device being attached to a second car body portion, the extendable and retractable enclosure plate being able to be extended by the second raising and lowering device to form a sealed cabin together with the roof cover plate of the cabin and being retracted as the roof cover plate of the cabin is lowered.

10. The car according to claim 9, wherein the first raising and lowering device comprises a push rod that translates generally vertically and that has an upper end coupled to the roof cover plate; the second raising and lowering device comprises a push rod that translates generally vertically and that has an upper end coupled to the extendable and retractable enclosure plate.

11. The car according to claim 9, wherein the first raising and lowering device comprises left and right hydraulic cylinders which are respectively coupled to the left and right door frames near the respective rear sides of the left and right door frames, each hydraulic cylinder has a push rod, and the upper end of each push rod is pivotably coupled to the rear end of the roof cover plate.

12. The car according to claim 9, wherein the second raising and lowering device comprises left and right hydraulic cylinders which are respectively coupled to the left and right door frames near the respective rear sides of the left and right door frames, each hydraulic cylinder has a push rod, and the upper end of each push rod is pivotably coupled to underside of the rear end of the extendable and retractable enclosure plate.

13. The car according to claim 9, wherein the first and second raising and lowering device are coupled to the door frames.

14. The car according to claim 13, wherein the first and second raising and lowering device are pivotably coupled to the door frames.

15. The car according to claim 9, wherein the extendable and retractable enclosure plate is formed by a plastic, rubber, canvas or corrugated sheet.

16. A car having a cabin, the car comprising:
a front windshield,
a rear wall,
left and right car door frames, a surrounding wall of the cabin being formed by connecting the car door frames with the front windshield near a front side of the cabin and connecting the car door frames with the rear wall near a rear side of the cabin,
a cover panel having a front end hinged to an upper portion of the surrounding wall of the cabin, the cover panel having a rear windshield near its rear portion, the cover panel and the rear windshield forming an integral roof cover plate of the cabin, and
a raising and lowering device located under the rear end of the roof cover plate of the cabin, the raising and lowering device including a push rod that translates generally vertically and that has an upper end coupled to the roof cover plate.

* * * * *